A. W. ALTORFER.
BROODING COOP.
APPLICATION FILED AUG. 11, 1908.

948,716.

Patented Feb. 8, 1910.
2 SHEETS—SHEET 1.

Witnesses

Inventor
A. W. Altorfer,
By Hoan Lacey, Attorneys

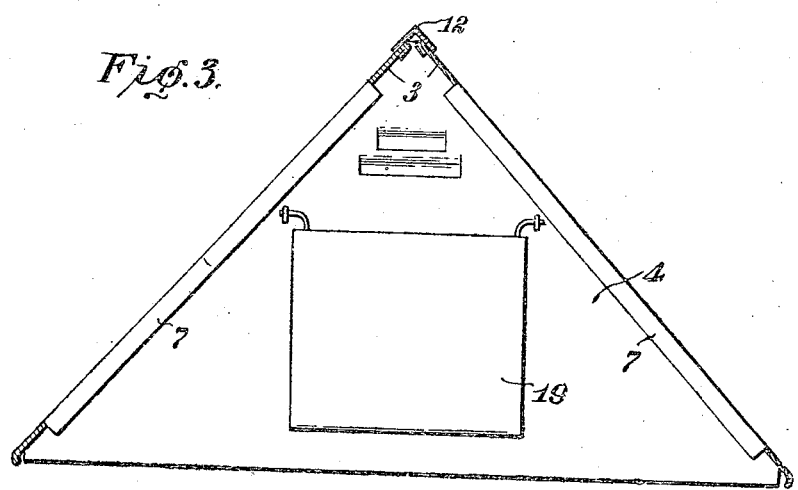
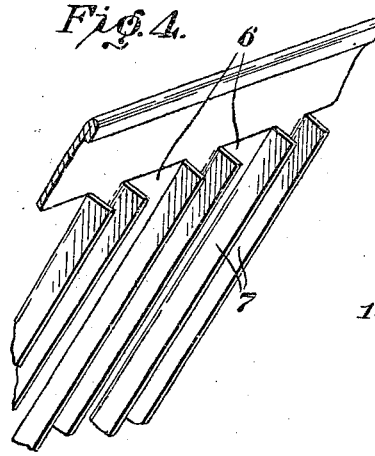
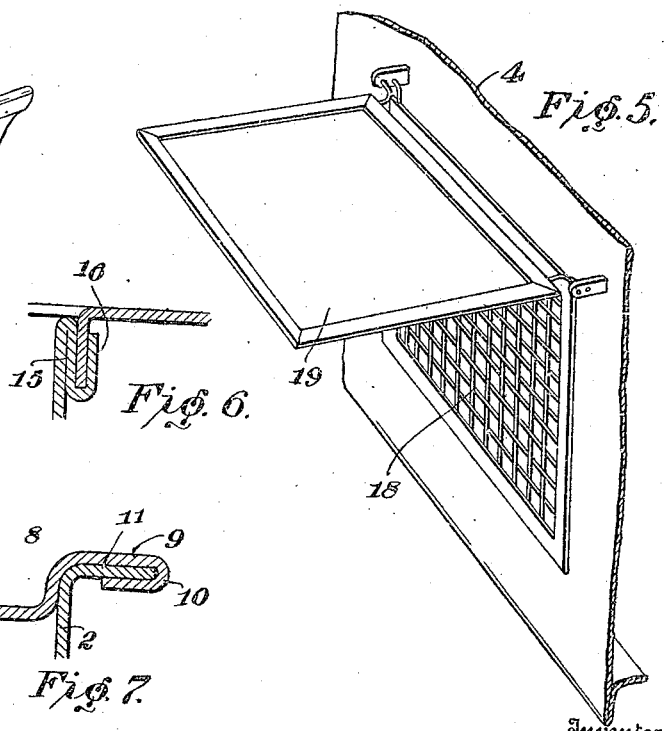
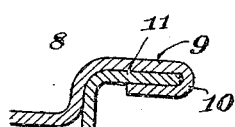

UNITED STATES PATENT OFFICE.

ALPHEUS W. ALTORFER, OF ROANOKE, ILLINOIS.

BROODING-COOP.

948,716. Specification of Letters Patent. Patented Feb. 8, 1910.

Application filed August 11, 1908. Serial No. 448,008.

*To all whom it may concern:*

Be it known that I, ALPHEUS W. ALTORFER, a citizen of the United States, residing at Roanoke, in the county of Woodford and State of Illinois, have invented certain new and useful Improvements in Brooding-Coops, of which the following is a specification.

The present invention appertains to structures for housing chicks and other animals, such as rabbits and the like, which will protect the same against the inroads of minks, rats and like enemies, and which may be easily and quickly folded into compact form when not required for immediate use so as not to be in the way or occupy space that may be otherwise advantageously utilized.

The invention also provides a coop of the character described which will insure thorough ventilation, sanitation and protect the chicks from draft and also provide an inclosure in conjunction with the brooding chamber to admit of the chicks having freedom without being exposed to the ravages of their natural enemies.

For a full understanding of the invention and the merits thereof and also to acquire a knowledge of the details of construction and the means for effecting the result, reference is to be had to the following description and accompanying drawings.

Figure 1:
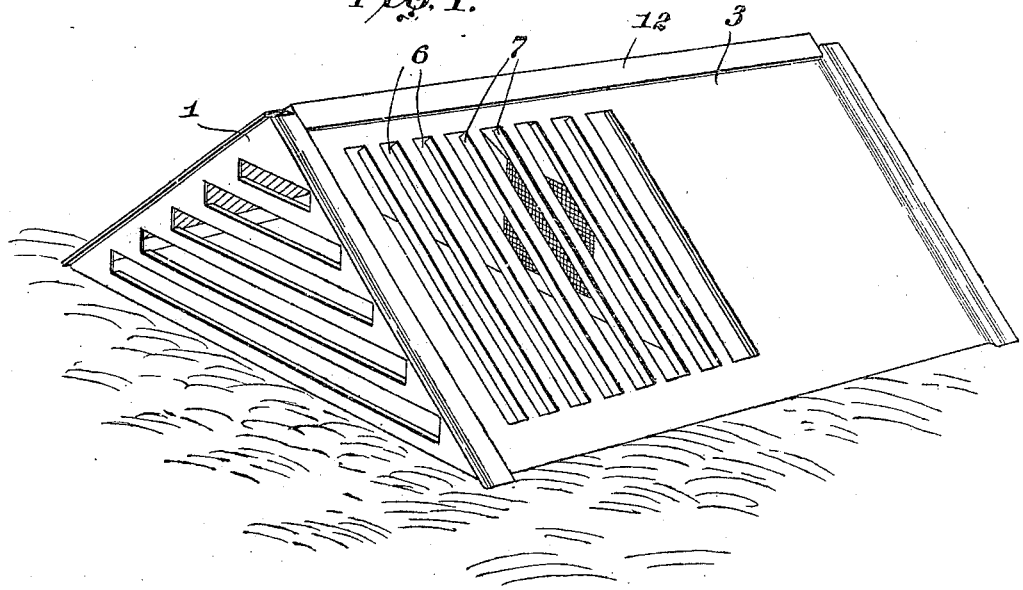
Figure 2:
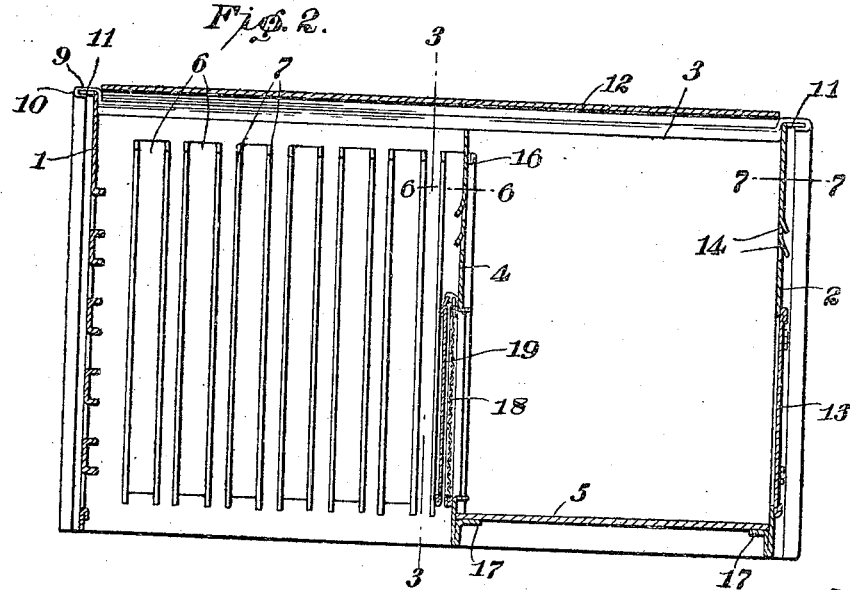

While the invention may be adapted to different forms and conditions by changes in the structure and minor details without departing from the spirit or essential features thereof, still the preferred embodiment is shown in the accompanying drawings, in which:

Figure 1 is a perspective view of a brooding coop embodying the invention. Fig. 2 is a vertical central longitudinal section thereof. Fig. 3 is a transverse section on the line 3—3 of Fig. 2, looking in the direction of the arrows. Fig. 4 is a detail perspective view of a portion of one of the sides. Fig. 5 is a detail perspective view of a portion of the partition, showing both the screen and the solid doors for covering the opening thereof. Fig. 6 is a detail section on the line 6—6 of Fig. 2. Fig. 7 is a section on the line 7—7 of Fig. 2, showing the interlocking joint formed between a side and an end section.

Corresponding and like parts are referred to in the following description and indicated in all the views of the drawings by the same reference characters.

The framework of the coop comprises ends 1 and 2 and sides 3, the latter being inclined so as to form a top closure. The several parts 1, 2 and 3 constitute metal sections preferably of galvanized iron, which is both durable and light, besides admitting of the formation of interlocking joints, so that the several sections may be connected or disconnected by a relative sliding movement incident to the slipping of the parts both when assembling the sections or dismembering the structure preliminary to reducing the same to a knock-down condition. The structure is divided by a partition 4 to form a brood chamber and an exercising chamber. The brood chamber is closed, whereas the sides of the exercising chamber are open or slotted to admit light and air. The brood chamber is provided with a bottom 5, whereas the exercising chamber is without a bottom other than the earth upon which the coop is placed, thereby enabling the chicks to scratch and pick.

The sides 3 are of similar formation, an end portion of each corresponding to the part inclosing the brood chamber being solid, whereas the opposite end portion is formed with slots 6 to provide openings to admit air and light. The slots 6 are formed by parallel slits which are intersected at their ends by other cross slits, portions bordering upon the parallel slits being bent from the sections to provide slots 6 and flanges 7, the latter serving to stiffen and strengthen the sides. The parts separating the slots 6 form in effect slats or bars which by reason of their formation are an integral part of the sides. The end portion of each side 3 is bent outward, as shown at 8, forming an off-set, thence parallel with the side, as shown at 9 and recurved, as at 10, to embrace an outer flange 11 along the edge of the front 1 or back 2 forming the end sections. The end sections when the parts are assembled, is confined between the off-set 8 and the fold formed between the parts 9 and 10. After the end sections have been placed in position, the sides are slipped in place first one then the other, the outer flanges 11 of the end sections passing into the spaces formed between the parts 9 and 10, inward displacement of the end sections being prevented by the off-set portions 8 against which they bear. A cap strip 12 closes the space formed between the upper edges of the sides 3 and said cap strip is retained in place by any suitable means. The front section 1 is formed with slots similar to the slots 6 of the sides 3, the purpose being to admit air and light. The back section 2 has an opening which is closed by means of a door 13, the same being hinged and adapted to be secured when closed by any suitable fastening means. Openings 14 are formed in the upper portion of the back section 2 for ventilation, portions being pressed outward from the section to provide said openings. The partition 4 like the end sections, is of triangular form and its edge portions are adapted to interlock with inner flanges of the sides. For this purpose the inclined edges of the partition are provided with outer flanges formed by bending a portion of each edge upon itself, as shown at 15, thence outward, as shown at 16, the spaces between the bent portions 15 and 16 receiving the inner flanges of the sides. The interlocking flanges of the sides 3 consist of flanges 7, the innermost ones being selected so that the inclosing sides and top of the brood chamber are slotted. The lower portion of the partition 4, as also the back section 2, has an inner flange 17 upon which the bottom 5 rests. The inner flanges 17 are parts of the sections 4 and 2, being formed by bending the lower edge portions of said sections upward, thence outward, whereby the flanges 17 are located some distance from the lower edges of the sections 2 and 4.

Communication between the two chambers of the coop is had by means of an opening formed in the partition 4, said opening being closed by means of a screen door 18 and a solid door 19, the latter covering the screen door so as to exclude light and prevent drafts. When the door 19 is opened air and light are admitted into the brood chamber through the screen door and when the latter is opened, the chicks have unobstructed passage between the brood and exercising chambers.

When the coop is set up, the several sections are connected both by slip and interlocking joints. When the coop is not required for immediate use, the sections may be readily separated and placed one upon the other in a knock-down condition, thereby occupying a minimum amount of space for convenience of handling and storing. By reason of the peculiar formation of the coop, access may be readily had thereto, either for feeding or for giving the chicks any required attention. It is noted that the brood chamber is entirely closed at its bottom, ends and sides by metal sections, thereby preventing the natural enemies of chickens reaching the same.

Having thus described the invention, what is claimed as new is:

1. A coop having metallic side walls provided with transverse slots, the metal forming the side walls of said slots being pressed inwardly to produce spaced reinforcing flanges, a partition between the side walls and having its opposite vertical edge portions bent and re-bent to provide outwardly extending guide flanges adapted to receive and interlock with the adjacent reinforcing flanges of said side walls.

2. A coop having metallic side walls provided with transverse slots, the metal forming the side walls of said slots being pressed inwardly to produce spaced reinforcing flanges, end walls having interlocking engagement with the side walls, one of said end walls having its lower edge bent upwardly in spaced relation to the bottom thereof to produce a laterally extending supporting flange, a partition interposed between said side walls and having its opposite edge portions bent and re-bent to provide outwardly extending guide flanges adapted to receive the adjacent reinforcing flanges of said side walls and having its lower edge bent upwardly and laterally to form a supporting flange, and a bottom section resting on the supporting flanges of the end wall and partition.

3. A knock-down coop of the character described, comprising sheet metal sections comprising a partition, ends and sides, the latter having an end portion formed with openings and the opposite end portions made solid, the side walls of the openings being pressed inwardly to form flanges and the ends of the said sides having portions off-set and the extremities of the off-set portions re-bent, the end sections having their edge portions formed with outer flanges confined between the off-set and rebent end portions of the said sides, the partitions forming brood and exercising chambers having outwardly extended flanges at its edges to receive inner flanges of the sides and said partition and the back section having inner flanges near their lower edges, a metal bottom for the brood chamber supported upon the inner flanges of the partition and back, and doors closing openings formed in said partition and back sections.

4. A coop comprising a substantially triangular metallic body portion having converged side walls, a portion of each being imperforate and the remaining portion thereof provided with transverse slots, the metal forming the side walls of said slots being pressed inwardly to produce spaced reinforcing flanges, substantially triangular walls forming the opposite ends of the body portion and having interlocking engagement with the adjacent side walls, one of said end walls being provided with spaced horizontal slots and the other with an inwardly extending supporting flange spaced from the bottom of said end wall, a substantially triangular partition interposed between the side walls and having its opposite vertical edge portions provided with guide flanges adapted to receive the adjacent flanges of the side walls and its lower edge bent upwardly and laterally to produce a supporting flange, and a bottom section resting on the supporting flange of the end wall and said partition.

In testimony whereof I affix my signature in presence of two witnesses.

ALPHEUS W. ALTORFER. [L. S.]

Witnesses:
S. H. ALTORFER,
H. D. HOLLENBACK.